United States Patent [19]

Engler

[11] 4,023,663

[45] May 17, 1977

[54] MATRIX PRINTER COMPRISING LUBRICATED PRINTING WIRES

[75] Inventor: Peter Engler, Huttental-Weidenau, Germany

[73] Assignee: U.S. Philips Corporation, New York, N.Y.

[22] Filed: Sept. 5, 1975

[21] Appl. No.: 610,569

[30] Foreign Application Priority Data

Sept. 10, 1974 Germany ............................ 2443239

[52] U.S. Cl. ................................. 197/1 R; 184/16; 184/102

[51] Int. Cl.[2] ............................................. B41J 3/04

[58] Field of Search ................. 197/1 R; 101/93.04, 101/93.05; 184/16, 19, 22, 25, 64, 102

[56] References Cited

UNITED STATES PATENTS

| | | | |
|---|---|---|---|
| 2,784,809 | 3/1957 | Tollefsen et al. ................... | 184/102 |
| 2,813,599 | 11/1957 | Amberg ............................... | 184/16 |
| 2,928,338 | 3/1960 | Wockenfuss ...................... | 197/1 R X |
| 3,119,461 | 1/1964 | Enders .............................. | 184/102 X |
| 3,302,562 | 2/1967 | Nelson ............................. | 197/1 R X |
| 3,584,575 | 6/1971 | Distl ................................. | 197/1 R X |
| 3,672,482 | 6/1972 | Brumbaugh et al. ............... | 197/1 R |
| 3,889,793 | 6/1975 | Cattaneo ............................ | 197/1 R |

*Primary Examiner*—Ralph T. Rader
*Attorney, Agent, or Firm*—Frank R. Trifari; David R. Treacy

[57] ABSTRACT

A matrix printer comprising a fanned arrangement of printing wires. Near their bearing points the printing wires are guided through openings in tag portions bent out of the plane of a strip-shaped porous member containing a lubricant. Lubricant is thus applied to the printing wires by contact between the printing wires and the edges of the openings adjacent their bearing points. The described method of lubrication results in a substantial prolongation of the service life of the printing wires as well as of the bearings.

6 Claims, 3 Drawing Figures

MATRIX PRINTER COMPRISING LUBRICATED PRINTING WIRES

The invention relates to a matrix printer comprising a fanned arrangement of printing wires which are guided through a lubricant-absorbing member over part of their length.

In a known matrix printer of the kind set forth (German Offenlegungsschrift No. 2,330,883 to which U.S. Pat. No. 3,889,793 corresponds) the printing wires are guided over the major part of their length in tubes which are provided with milled openings wherethrough a liquid lubricant is applied to the space between the printing wires and the inner wall of the tubes. The lubricant originates from a porous, lubricant-absorbing layer which envelops the tubes, for example, a felt layer which has been immersed in a lubricant.

The provision of openings in the guide tubes is not only time consuming and hence expensive, but it should also be effected with the utmost of care so as to prevent burrs.

The invention has for its object to provide a matrix printer of the kind set forth, comprising a lubricant-absorbing and lubricant-supplying member which can be simply and inexpensively manufactured and wherein the drawbacks of the known matrix printer are avoided.

To this end, a matrix printer according to the invention is characterized in that the absorbing member consists of a strip of absorbing material which is provided, near the bearings of the printing wires, with tags which are bent out of the plane of the strip and which are provided with openings wherethrough a printing wire is guided in pressure contact with the edge of the opening.

The invention will be described in detail hereinafter with reference to the drawing.

Figure 1A:
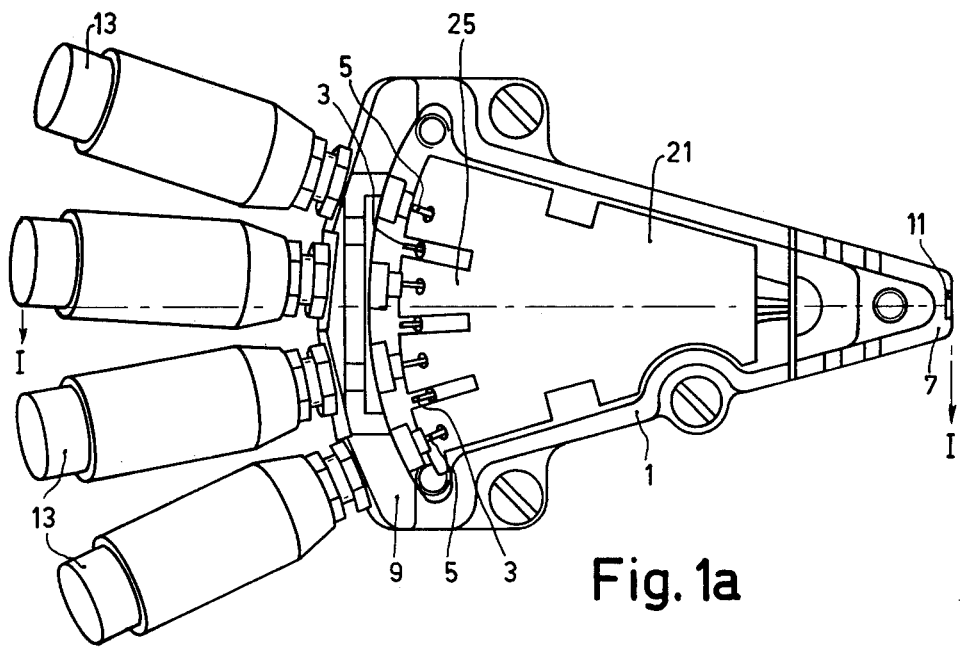
FIGS. 1a and 1b are a plan view and a longitudinal sectional view, respectively, of a part of a matrix printer according to the invention wherein the supply of lubricant is effected in one location.
Figure 1B:
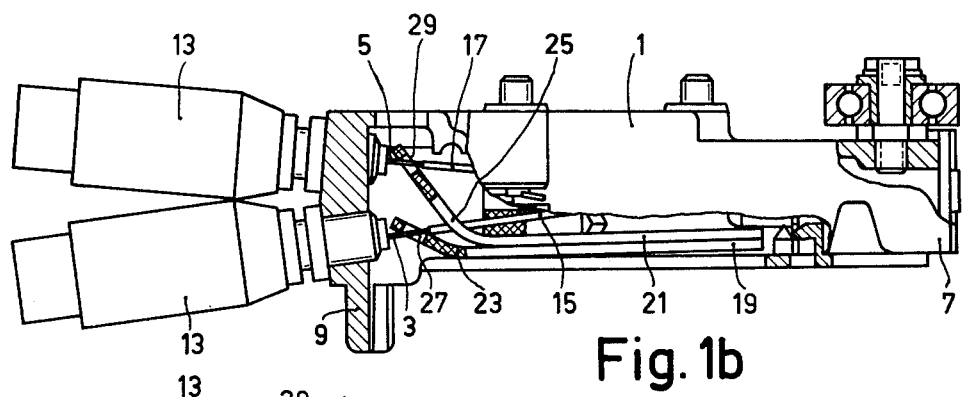

The part of a matrix printer shown in the FIGS. 1a and 1b, the so-called printing head, comprises a box-like frame 1 wherein a first series of three printing wires 3 and a second series of four printing wires 5 are arranged. The printing wires 3 are situated over the printing wires 5 over the major part of their length. The printing wires 3 and 5 fan out from a (foremost) end 7 towards a (rearmost) end 9 of the frame 1. The foremost end is to be understood to mean the end which is nearest to the record carrier during printing. The foremost ends of the printing wires 3 and 5 are guided in a bearing 11 which may consist, for example, of a saphire. The rearmost ends of the printing wires are connected to the armatures (not shown) of electromagnets 13, only four of which are shown in FIG. 1a. The electromagnets 13 are secured to the rearmost part of the frame 1. The center lines of the electromagnets corresponding to the printing wires 3 are situated in one plane. The centre lines of the electromagnets corresponding to the printing wires 5 are also situated in one plane. The printing wires 3 and 5 are guided over the major part of their length in tubes 15 and 17, respectively. The described printing head is of a commonly used kind.

The box-like frame 1 contains a first felt strip 19 for the printing wires 3 and a second felt strip 21 for the printing wires 5 (see FIG. 1b). The two felt strips 19 and 21 have been drenched in a suitable lubricant, for example, known and commonly used machine oils of suitable viscosity.

The felt strips 19 and 21 are provided with tags 23 and 25, respectively, wherein openings 27 and 29, respectively, are provided. The tags 23 and 25 have been bent out of the plane of the felt strips 19 and 21. The felt strips 19 and 21 extend parallel to each other over the major part of their length. During the mounting of the electromagnets 13 in the frame 1, the printing wires 3 are inserted through the openings 27 of the tags 23, and the printing wires 5 are inserted through the openings 29 of the tags 25. The lowermost portion of the edges of the openings 27 and 29 is always in contact with the portion of the printing wires 3 and 5 just projecting from the guide tubes 15. Due to the forward movement of the printing wires during printing, lubricant — already present on the printing wires due to the pressure contact between the tags and the printing wires — is taken along to the guide tubes and therein it is constantly transported forwards due to capillary action. A lubricating film is thus formed between the printing wires and the inner wall of the guide tubes, the said film being constantly replenished as from the area of contact between the felt strips and the printing wires.

Figure 2:
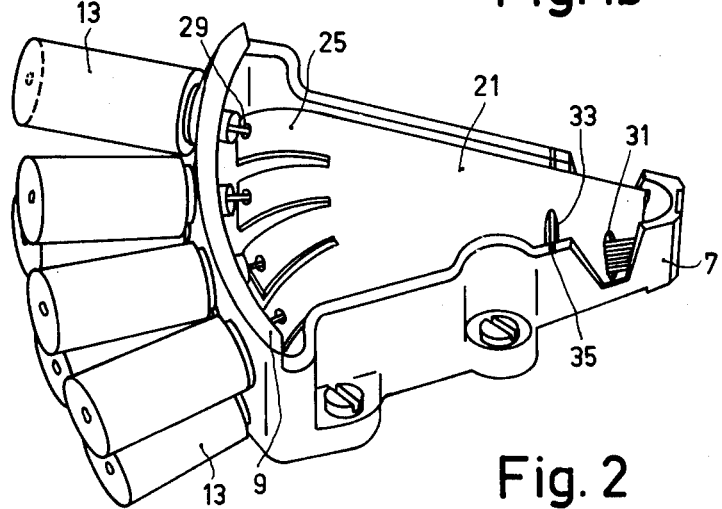
FIG. 2 shows a part of a matrix printer according to the invention wherein the printing wires are in contact with the absorbing body near both their ends.

The further embodiment of a matrix printer according to the invention which is shown in FIG. 2 is provided with references corresponding to those of the FIGS. 1a and 1b. The felt strip 21 in this embodiment is provided with an elongate openings 31 which is situated near the foremost end of the strip. Because in this location the printing wires already contact each other or are very near to each other, all wires are passed through one and the same opening 31 in the felt strip 21. The felt strip 19 (not visible) is somewhat shorter than the strip 21, and is not provided with an opening 31. However, the felt strip 19 can alternatively be provided with an identical opening 31 and the printing wires can also be passed through this opening. In order to ensure suitable contact pressure between all printing wires and the felt strip 21 at the area of the opening 31, the strip is provided with a cut-out 33. At the area of the cut-out 33, the strip is guided over a shaft 35, with the result that, if the length of the strip 21 is suitable chosen, pressure causes a shift of the portions situated before and after the recess 33 with respect to each other. If the felt strip 21 were not shifted, only the two outer printing wires would be in contact with the edge of the opening 31, because the printing wires contact or almost contact each other in a vertical plane at the area of the opening 31. When it is ensured that near the two ends of the printing wires contact with the felt strips is established, lubricant is transported to the guide tubes on both sides, i.e. on the rear of the printing head during the forward movement of the printing wires, and on the front of the printing head during the return movement of the printing wires.

The invention is not restricted to matrix printers wherein the printing wires are journalled in guide tubes over the major part of their length. Printers wherein the printing wires are locally guided in tubes or openings in bearing strips can also be provided with a strip containing a lubricant. In that case the tags in the strips are not only situated near the two ends of the printing wires, but in every location where a bearing is present. Matrix printers comprising a fanned arrangement of printing wires are to be understood to mean printers wherein the printing wires — viewed from their printing end — follow a diverging path. The printing wires may be straight over a comparatively large part of their length.

For the lubricant use can generally be made of lubricants which can penetrate into the porous material of the strip and are forced out of the strip again by pressure contact, and which also ensure proper lubrication between the materials commonly used in matrix printers for printing wires and bearings.

The material of the lubricating strip is not restricted to felt. Actually, use can be made of any porous, lubricant-resistant material which can be processed into strips and wherefrom slightly flexible tags can be cut.

What is claimed is:

1. A matrix printer comprising a plurality of printing wires, journal means for guiding said wires in a fanned arrangement, and a lubricant absorbing member for providing lubricant to said wires, wherein said lubricant absorbing member comprises a strip of absorbent material having tag portions, each tag having an opening therethrough, each printing wire passing through at least one respective tag opening, said tags being arranged so that the printing wire guided therethrough is in pressure contact with an edge of the opening.

2. A printer as claimed in claim 1, wherein said printing wires have a printing end and a remote end, said wires being guided through the tags near their printing ends.

3. A printer as claimed in claim 2, wherein said absorbent material is a strip of felt.

4. A printer as claimed in claim 3, wherein said strip is a generally planar fan-shaped strip, said tags being bent out of the plane of the strip.

5. A printer as claimed in claim 2, wherein said strip has an end remote from said tags, said end having a common elongate opening, and wherein said journal means also guides said wires together through said common elongate opening, said strip end being arranged so that said printing wires engage an edge of said elongate opening under pressure contact.

6. A printer as claimed in claim 2, wherein said printing wires are arranged in a plurality of fan-shaped series, remote ends of the wires of a series lying in a plane, and comprising a corresponding plurality of generally planar parallel fan-shaped strips of absorbent material, one strip associated with each series and each tag having one opening only through which one printing wire only is guided, said tags being bent out of the planes of the respective strips.

* * * * *